United States Patent
Krishnaswamy et al.

(10) Patent No.: US 7,580,778 B2
(45) Date of Patent: Aug. 25, 2009

(54) METHODS AND SYSTEMS FOR CONTROLLING MULTI-BODY VEHICLES WITH FUEL SLOSH

(75) Inventors: Kailash Krishnaswamy, Little Canada, MN (US); Dan Bugajski, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 525 days.

(21) Appl. No.: 11/425,925

(22) Filed: Jun. 22, 2006

(65) Prior Publication Data

US 2009/0076669 A1    Mar. 19, 2009

Related U.S. Application Data

(60) Provisional application No. 60/693,358, filed on Jun. 23, 2005.

(51) Int. Cl.
*G05D 1/08* (2006.01)
*G06F 19/00* (2006.01)

(52) U.S. Cl. .......................... 701/13; 701/4; 244/158.1; 244/164

(58) Field of Classification Search ............ 701/3, 701/4, 13, 11, 29; 244/158.1, 158.4, 164, 244/165, 171.1, 171.3, 172.5
See application file for complete search history.

(56) References Cited

U.S. PATENT DOCUMENTS

| 5,452,869 | A | 9/1995 | Basuthakur et al. |
| 5,791,598 | A * | 8/1998 | Rodden et al. ............... 244/165 |
| 6,246,929 | B1 * | 6/2001 | Kaloust ...................... 701/11 |
| 6,643,569 | B2 * | 11/2003 | Miller et al. .................. 701/29 |

FOREIGN PATENT DOCUMENTS

| EP | 0119810 | 9/1984 |
| EP | 1128247 | 8/2001 |

* cited by examiner

*Primary Examiner*—Tan Q Nguyen
(74) *Attorney, Agent, or Firm*—Fogg & Powers LLC

(57) ABSTRACT

Methods and systems for controlling multi-body vehicles with fuel slosh are provided. In a method for stabilizing a vehicle with fuel slosh, a controller for a multi-body assembly is formed by selecting vehicle configuration and velocity as states of a rigid body. Equations of motion are written for the multi-body assembly, and velocity states are determined that are unactuated. A decoupling transformation is defined from the unactuated velocity states. The equations of motion are transformed using the decoupling transformation such that unactuated states are decoupled from actuated states. A slosh state estimator is coupled to the controller such that it is in operative communication with an input to the controller and an output from the controller.

20 Claims, 9 Drawing Sheets

METHODS AND SYSTEMS FOR CONTROLLING MULTI-BODY VEHICLES WITH FUEL SLOSH

This application claims the benefit of priority to U.S. Provisional Application No. 60/693,358, filed on Jun. 23, 2005, the disclosure of which is herein incorporated by reference.

BACKGROUND

The interaction of sloshing fuel in a vehicle and vehicle motion directly impacts vehicle performance and may lead to system instability. In addition, space vehicles often involve simultaneous motion of multiple rigid bodies. A controller designed for the simpler single rigid body model of a space vehicle when implemented on the actual multiple rigid body vehicle can destabilize the system, if appropriate caution is not exercised during design/implementation.

It is possible to minimize the effect of sloshing fuel with the aid of baffles in fuel tanks, although at the expense of adding unnecessary weight to the vehicle and hence cost to the mission. The effect of multiple rigid body dynamics can also be minimized by linearizing about each operating condition and designing a controller, although this leads to unnecessary lines of code whose verification and validation will only increase the cost of development.

Previous research has focused on either control of space vehicles as a single rigid body or modeling of space vehicles as multi-rigid bodies with fuel slosh. Moreover, it has also been generally assumed that the dynamics under consideration were fully actuated.

For example, controllers have been developed for space vehicles in the ascent or descent phases. In some of these, it is assumed that the space vehicle can be modeled as a single rigid body and the controllers are operated on the axial torques of a rigid body. Adaptive guidance laws have also been proposed to aid in the entry of a class of space vehicles. The guidance laws used point mass dynamics of a space vehicle.

In considering the effect of fuel slosh on space vehicles for control design, a space craft itself has been modeled as a single rigid body with constant axial thrust, pitching moment, and side gas jet thrusters. A controller was designed which operated on the gas jet thrusters and pitching moment to regulate fuel slosh. However, the control problem of simultaneous sloshing fuel and multi-rigid body motion of the space vehicle was not considered. In another case, stability analysis of a launch vehicle modeled as a single rigid body with fuel slosh modeled as a pendulum was considered. However, no systematic control design procedure was proposed. The effect of a gimbaled engine and fuel slosh on the motion of a booster at launch has also been considered. A dynamic inversion controller was proposed, but the design of the controller was not presented. Although the controller incorporated the effect of fuel slosh dynamics, it did not minimize fuel slosh.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1A:
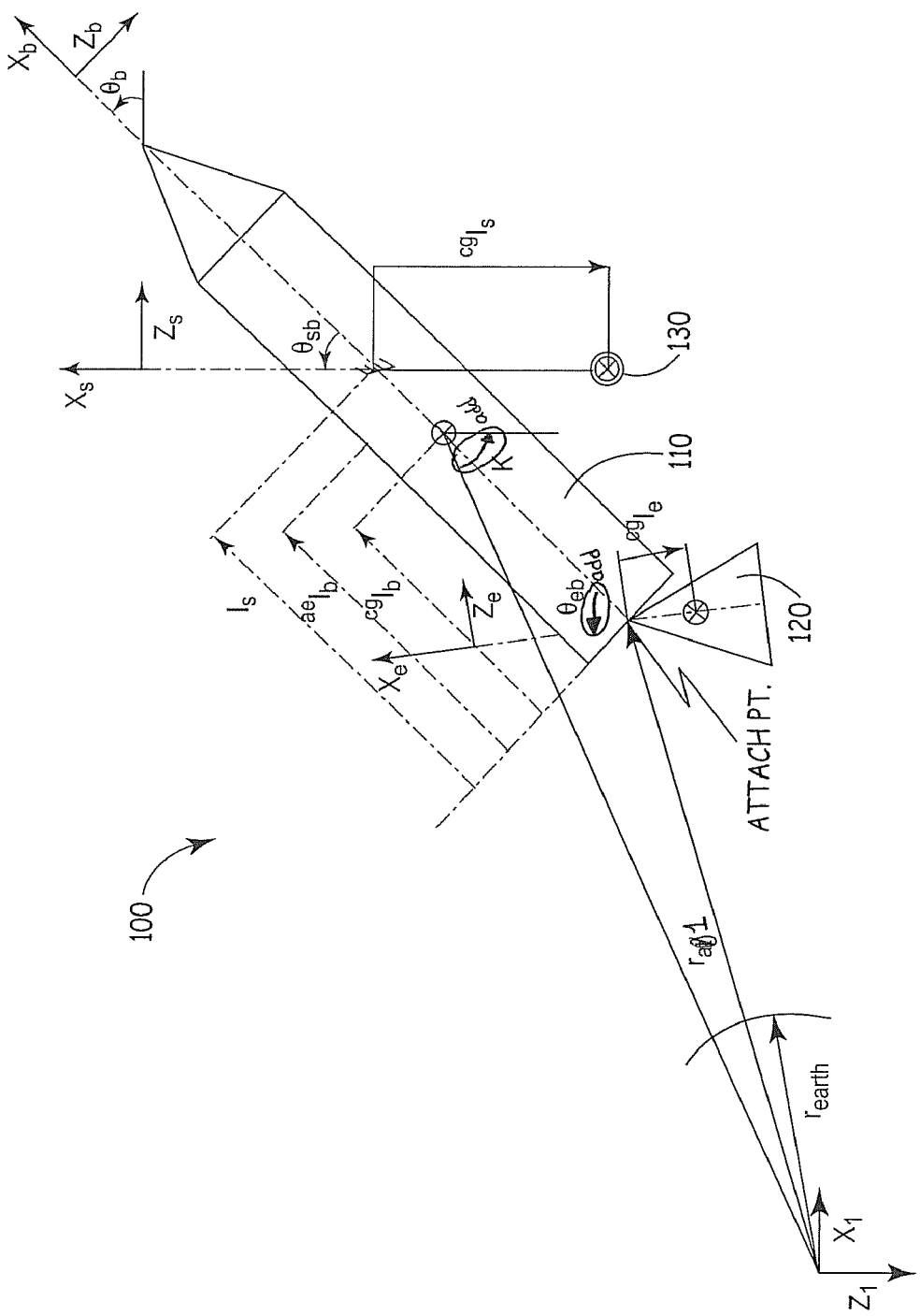
FIG. 1A is a schematic diagram showing the coordinate frames of a launch vehicle used in simulations.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention relates to methods and systems for controlling multi-body vehicles with fuel slosh. One aspect of the invention includes a systematic output feedback design procedure for decoupled control of multiple rigid body systems, especially for those that are under-actuated, such as inner loop control of multi-body launch vehicles with fuel slosh. The control design procedure can also accommodate additional controls to actively damp slosh. Typical applications for the present methods may include ascent or descent of a class of space vehicles, in-orbit vehicles whose tasks include simultaneous motion of multiple rigid bodies, and the like.

The dynamics considered herein are that of a critically underactuated system. The dynamic inversion-based control provided by the present invention exploits an isometric transformation to maintain the stability properties of the uncontrolled dynamics. A dynamic inversion-based nonlinear control algorithm accounts for the coupled dynamics of interconnected rigid bodies. Specifically, the controller regulates engine pitch angle for a vehicle by operating on the engine gimbal torque in the presence of fuel slosh. The controller can use an estimate of the slosh dynamics provided by a reduced-order slosh observer in the likely event that the slosh states cannot be measured.

While the present invention is discussed primarily with respect to controlling a launch vehicle such as a rocket or other spacecraft, it should be understood that the invention can be applied to other vehicle types where fuel slosh needs to be considered such as airships.

As described more fully hereafter, the dynamics of a launch vehicle (such as a rocket) include a booster (rigid body #1), a gimballed engine (rigid body #2), and fuel slosh (rigid body #3) that is modeled as a normal pendulum attached to the booster-vehicle. The dynamics are restricted to evolve in a vertical plane and only the longitudinal dynamics of the launch vehicle are considered. The attitude dynamics of the launch vehicle are critically underactuated, meaning that the number of control inputs (e.g., 1—engine gimbal torque) is less than the number of rigid bodies (e.g., 2—angular velocities) to be controlled.

The methods and techniques described herein may be implemented in digital electronic circuitry, or with a programmable processor (for example, a special-purpose processor or a general-purpose processor such as a computer), firmware, software, or in combinations thereof. Apparatus embodying these method and techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output.

The method and techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD disks, DVD disks, and the like. Any of the foregoing may be supplemented by, or incorporated in, specially-designed application-specific integrated circuits (ASICs). Table 1 below lists the nomenclature used in the following description, indicating various symbols and their corresponding meaning as used in the equations hereafter.

TABLE 1

Nomenclature

| Symbol | Meaning |
| --- | --- |
| m | Mass, kg |
| $P^{yy}$ | Y-Body axis Moment-of-Inertia, kg m$^2$ |
| $\omega$ | Angular velocity in inertial frame, rad/s |
| $\theta$ | Angular position, rad |
| $^{cg}l$ | Distance between attach (ref) point and cg, m |
| $l_s$ | Length of slosh pendulum, m |
| $^{ae}l_b$ | Distance between ref point and aerodynamic center on the booster, m |
| x | Distance along X-inertial axis. Origin is the center of earth, m |
| z | Distance along the Z-inertial axis, m |
| $v_x$ | Velocity along the X-booster fixed body axis, m/s |
| $v_z$ | Velocity along the Z-booster fixed body axis, m/s |
| $\alpha$ | Angle of attack, rad |
| $\kappa$ | $\tan^{-1}(x/-z)$, rad |
| D | Drag, N |
| L | Lift, N |
| g | Acceleration due to gravity, m/s$^2$ |
| $M_m$ | Aerodynamic torque about booster Y-body axis, Nm |
| TH | Throttle input, N |
| S | sin(angle) |
| C | cos(angle) |
| $\tau$ | Engine gimbal torque input, Nm |
| Subscript | |
| b | booster |
| e | engine |
| s | slosh pendulum |
| eb | engine w.r.t. booster |
| sb | slosh pendulum w.r.t. booster |

Control Model

In presenting the modeling of a controller for the present invention, the motion of a launch vehicle is restricted to the vertical plane. The methodology, as explained herein, can be as well applied to the 6 degrees of freedom of a rigid body. FIG. 1A is a schematic diagram showing the coordinate frames of a launch vehicle 100 used for modelling, which has five degrees of freedom (DOF). These include two translational DOF describing the position of vehicle 100 in inertial (earth-fixed) space, one rotational DOF of the orientation of a booster 110, one rotational DOF of the orientation of a gimballed engine 120, and one rotational DOF of the first mode of fuel slosh modeled as a pendulum 130 pivoted about a point on the body axis of booster 110.

The longitudinal dynamics of launch vehicle 100 are presented in equation (Eq.) (1) below. Hereafter, the dynamics given in Eq. (1) will be referred to as the "high-fidelity" model of the vehicle.

$$M(\xi)\ddot{\xi} + C(\xi, \dot{\xi})\dot{\xi} - g_d(\xi, d) + B\tau \qquad (1)$$

where $$M(\xi) = \begin{pmatrix} P_a^{yy} + m_e(^{cg}l_e)^2 & *1 & 0 & *2 & *3 \\ P_a^{yy} + m_e(^{cg}l_e)^2 & P_{eg}^{yy} & *4 & *5 & *6 \\ 0 & m_s(^{cg}l_e)l_s C\theta_{sb} & P_a^{yy} + m_s(^{cg}l_s)^1 & *7 & *8 \\ m_e(^{cg}l_e)S\theta_{eb} & m_e(^{cg}l_e)S\theta_{eb} & m_s(^{cg}l_s)S\theta_{sb} & m_{bes} & 0 \\ m_e(^{cg}l_e)C\theta_{eb} & mL & m_s(^{cg}l_s)C\theta_{sb} & 0 & m_{bes} \end{pmatrix},$$

-continued $$C(\xi, \zeta) = \begin{pmatrix} 0 & 0 & 0 & -m_e(^{cg}l_e)C\theta_{eb}\omega_b & m_e(^{cg}l_e)S\theta_{eb}\omega_b \\ 0 & 0 & -m_e(^{cg}l_e)l_sS\theta_{eb}\omega_b & -mL\omega_b & m_e(^{cg}l_e)S\theta_{eb}\omega_b \\ 0 & -m_e(^{cg}l_e)l_sS\theta_{eb}\omega_b & 0 & -m_e(^{cg}l_e)C\theta_{sb}\omega_b & -m_s(^{cg}l_s)S\theta_{sb}\omega_b \\ m_e(^{cg}l_e)C\theta_{eb}\omega_b & mL\omega & m_s(^{cg}l_s)C\theta_{sb}\omega_b & 0 & m_{bes}\omega_b \\ -m_e(^{cg}l_e)S\theta_{eb}\omega_b & -m_e(^{cg}l_e)S\theta_{eb}\omega_b & -m_s(^{cg}l_s)S\theta_{sb}\omega_b & -m_{bes}\omega_b & 0 \end{pmatrix},$$

$$g_d(\xi, d) = \begin{pmatrix} m_e(^{cg}l_e)g(z)C(\kappa + \theta_b + \theta_{eb}) \\ (DS\alpha + LC\alpha)(^{ae}l_b) + M_m + [m_sl_s - m_s(^{cg}l_b)C(\kappa + \theta_b) + m_e(^{cg}l_e)C(\kappa + \theta_b + \theta_{ab})]g(z) \\ m_s(^{cg}l_s)g(z)C(\kappa + \theta_b + \theta_{sb}) \\ -DC\alpha + LS\alpha - m_{bes}g(z)S(\kappa - \theta_b) + C\theta_{eb} \cdot TH \\ -DS\alpha - LC\alpha + m_{bes}g(z)C(\kappa + \theta_b) - S\theta_{eb} \cdot TH \end{pmatrix}$$

$$B = \begin{pmatrix} 1 \\ 0 \\ 0 \\ 0 \\ 0 \end{pmatrix},$$

$$m_{bes} = m_b + m_e + m_s, \; P_{eq}^{yy} = P_b^{yy} + I_e^{yy} + m_b(^{cg}l_b)^2 + m_e(^{cg}l_e)^2 + m_sl_s^2,$$

$$mL = m_e(^{cg}l_e)C\theta_{eb} + m_sl_s - m_b(^{cg}l_b), \; mL\omega = m_e(^{cg}l_e)C\theta_{eb}\omega_e + \left(m_sl_s - m_b(^{cg}l_b)\right)\omega_b,$$

$$\xi = [\theta_{eb}, \theta_b, \theta_{sb}, x, z]^T \text{ and } \dot{\xi} = [\omega_e - \omega_b, \omega_b, \omega_s, v_x, v_z]^T.$$

It should be noted that in the above equation, the engine thrust (TH) is lumped with the disturbance vector ($g_d(\cdot)$). This is because engine thrust is not considered as an input to the launch vehicle. It is assumed that TH will be given by some thrust profile. In the absence of wind, the angle of attack is given by $\alpha = \tan^{-1}(v_z/v_x)$. The values for the physical parameters in the model are given in Table 2.

TABLE 2

Physical Parameters

| Parameter | Value (SI units) |
|---|---|
| $m_b$ | 1.456E6 |
| $m_e$ | 2.92E4 |
| $m_s$ | 1.46E4 |
| $P_b^{yy}$ | 2.49E8 |
| $P_e^{yy}$ | 3.93E4 |
| $P_s^{yy}$ | 0 |

TABLE 2-continued

Physical Parameters

| Parameter | Value (SI units) |
|---|---|
| $(^{cg}l_b)$ | 30.48 |
| $(^{cg}l_e)$ | 4.57 |
| $(^{cg}l_s)$ | 2.44 |
| $l_s$ | 36.57 |
| $(^{ae}l_b)$ | 33.53 |
| TH | 5.16E7 |

A "low-fidelity" model of the launch vehicle is considered as follows. The low-fidelity model is a two rigid body model simplification of launch vehicle 100 and is given in Eq. (2) below. The model was derived by assuming that the slosh pendulum is constrained with respect to the booster, for example, welded to the body.

$$M_l(\xi_l)\ddot{\xi}_l + C_l(\xi_l, \dot{\xi}_l)\dot{\xi}_l = g_{dl}(\xi_l, d) + B_l\tau, \quad (2)$$

$$M_l(\xi)_l = \begin{pmatrix} P_a^{yy} + m_e(^{cg}l_e)^2 & *1 & *2 & *3 \\ P_a^{yy} + m_e(^{cg}l_e)^2 & P_{eq2}^{yy} & *5 & *6 \\ m_e(^{cg}l_e)S\theta_{eb} & m_e(^{cg}l_e)S\theta_{eb} & m_{be} & 0 \\ m_e(^{cg}l_e)C\theta_{eb} & mL_2 & 0 & m_{be} \end{pmatrix}, \quad (3)$$

-continued $$C_I(\xi_I, \zeta_I) = \begin{pmatrix} 0 & 0 & -m_e(^{cg}l_e)C\theta_{eb}\omega_b & m_e(^{cg}l_e)S\theta_{eb}\omega_b \\ 0 & 0 & -mL_2\omega_b & m_e(^{cg}l_e)S\theta_{eb}\omega_b \\ m_e(^{cg}l_e)C\theta_{eb}\omega_e & mL_2\omega & 0 & m_{be}\omega_b \\ -m_e(^{cg}l_e)S\theta_{eb}\omega_e & -m_e(^{cg}l_e)S\theta_{eb}\omega_e & -m_{be}\omega_b & 0 \end{pmatrix},$$ (4)

$$g_{dI}(\xi_I, d) = \begin{pmatrix} m_e(^{cg}l_e)g(z)C(\kappa + \theta_b + \theta_{eb}) \\ (DS\alpha + LC\alpha)(^{ae}l_b) + M_m + [-m_b(^{cg}l_b)C(\kappa + \theta_b) + m_e(^{cg}l_e)C(\kappa + \theta_b + \theta_{eb})]g(z) \\ m_s(^{cg}l_s)g(z)C(\kappa + \theta_b + \theta_{sb}) \\ -DC\alpha + LS\alpha - m_{be}g(z)S(\kappa - \theta_b) + C\theta_{eb} \cdot TH \\ -DS\alpha - LC\alpha + m_{be}g(z)C(\kappa + \theta_b) - S\theta_{eb} \cdot TH \end{pmatrix}$$ (5)

$$B = \begin{pmatrix} 1 \\ 0 \\ 0 \\ 0 \\ 0 \\ 0 \end{pmatrix},$$ (6)

and where $$m_{be} = m_b + m_e, \quad P_{eq2}^{yy} = I_b^{yy} + I_e^{yy} + m_b(^{cg}l_b)^2 + m_e(^{cg}l_e)^2,$$
$$mL_2 = m_e(^{cg}l_e)C\theta_{eb} - m_b(^{cg}l_b), \quad mL\omega_2 = m_e(^{cg}l_e)C\theta_{eb}\omega_e - m_b(^{cg}l_b)\omega_b,$$
$$\xi_I = [\theta_{eb}, \theta_b, x, z]^T \text{ and } \dot{\xi}_I = [\omega_e - \omega_b, \omega_b, v_x, v_z]^T.$$

Controller and Observer Design

The following describes a systematic control design procedure for inner loop control which is applicable to both the low and high fidelity models described above. This procedure is generic enough to design an inversion based controller for various underactuated systems. For example, the procedure can handle single or multiple rigid body models or models with multiple fuel tanks and hence multiple slosh modes. For the purposes of the following description, the arguments of most functions (matrices or vectors) will be dropped to avoid clutter; an explicit reference will be made only when it may eliminate confusion.

It should be noted from Eq. (1) that the engine gimbal torque input $\tau$ affects the booster relative engine angular acceleration ($\dot{\omega}_w - \dot{\omega}_b = \ddot{\theta}_{eb}$), thus making $\tau$ a natural choice to regulate thrust angle relative to the booster, $\theta_{eb}$. However, the inertia matrix $M(\xi)$ is coupled which might lead to complications in closed loop stability analysis. The representation of the dynamics (Eq. (1)) can be simplified by transforming the coordinates $\dot{\xi}$. Isometric transformations are a natural way of transforming the coordinate representation of the dynamics of rigid bodies while retaining their physical properties. Another benefit of using appropriate isometric transformations is their ability to represent equations of motion of connected rigid bodies in a set of coordinates with decoupled accelerations.

A. Isometric Transformation

The high-fidelity model dynamics (Eq. (1)) of the launch vehicle can be partitioned as follows:

$$\begin{pmatrix} M_{11} & M_{12} \\ M_{12}^T & M_{22} \end{pmatrix} \begin{bmatrix} \ddot{\xi}_1 \\ \ddot{\xi}_2 \end{bmatrix} + \begin{pmatrix} C_{11} & C_{12} \\ C_{21} & C_{22} \end{pmatrix} \begin{bmatrix} \dot{\xi}_1 \\ \dot{\xi}_2 \end{bmatrix} = \begin{pmatrix} g_{d1} \\ g_{d2} \end{pmatrix} + \begin{pmatrix} 1 \\ 0 \end{pmatrix} \tau$$ (7)

where $\dot{\xi}_1 = \ddot{\theta}_{eb}$ and $\dot{\xi}_2 = [\omega_b, \omega_s, v_x, v_z]^T$.

The rationale for choosing $\theta_{eb}$ as the control variable is so that the thrust produced by the engine can be directed in a desired direction (subject to hardware constraints). This will result in a controllable moment on the launch vehicle that can be used to regulate the attitude of the booster. Hence the engine gimbal angle $\theta_{eb}$ is chosen as the control variable (CV).

If standard nonlinear control design approaches are used such as dynamic inversion applied to the dynamics (Eq. 7), the stability of the zero-dynamics of the closed-loop system needs to be addressed. This, given the structure of the inertia matrix, $M(\xi)$, can be an arduous task. Analysis of the closed loop launch vehicle system can be greatly simplified if the dynamics (Eq. 7) can be expressed in a coordinate system which decouples the engine gimbal accelerations ($\dot{\omega}_e - \dot{\omega}_b$) from the other accelerations. Designing a feedback linearizing controller is then much simpler. Consider the following transformation $S_{-1}(\xi)$:

$$\eta = \begin{bmatrix} \theta_{eb} \\ \eta_2 \end{bmatrix} = \underbrace{\begin{pmatrix} 1 & 0 \\ M_{22}^{-1}M_{12}^T & I_4 \end{pmatrix}}_{S^{-1}(\xi)} \begin{bmatrix} \xi_1 \\ \xi_2 \end{bmatrix}.$$ (8)

The transformation $S(\xi)$ is well-defined for all $\xi$ as $M_{22}(\xi)$ is positive definite for all $\xi$, hence invertible. Using the above transformation, the dynamics Eq. (1)≡Eq. (7) can be transformed as follows:

$$S^T M(\xi) S \ddot{\eta} + S^T (C(\xi, \dot{\eta})S + M(\xi)\dot{S})\dot{\eta} = S^T g_d(\xi, d) + S^T B\tau,$$

where $\dot{S}$ is the time derivative of the elements of S. Upon substituting Eq. (8) in the above equation and doing the necessary algebraic computations, the transformed dynamics can be represented as the following system:

$$\begin{pmatrix} M_{eq} & 0 \\ 0 & M_{22} \end{pmatrix} \begin{bmatrix} \ddot{\theta}_{eb} \\ \ddot{\eta}_2 \end{bmatrix} + \begin{pmatrix} D_{11} & D_{12} \\ D_{21} & D_{22} \end{pmatrix} \begin{bmatrix} \dot{\theta}_{eb} \\ \dot{\eta}_2 \end{bmatrix} = \qquad (9)$$

$$\begin{pmatrix} g_{d1} - M_{12}M_{22}^{-1}g_{d2} \\ g_{d2} \end{pmatrix} + \begin{pmatrix} 1 \\ 0 \end{pmatrix} \tau,$$

where $M_{eq} = M_{11} - M_{12}M_{22}^{-1}M^T_{12}$. From Eq. (9) it should be noted that the transformation (8) decouples the engine gimbal acceleration, $\ddot{\theta}_{eb}$ from the other states. The additional advantage is that the control input $\tau$ only affects the engine gimbal acceleration, hence, making the task of design and subsequent closed loop analysis of a controller much simpler.

B. Controller

Based on Eq. (9), the control input $\tau$ can be chosen as follows:

$$\tau = \underbrace{(D_{11} \ D_{12}) \begin{bmatrix} \dot{\theta}_{eb} \\ \dot{\eta}_2 \end{bmatrix} - (g_{d1} - M_{12}M_{22}^{-1}g_{d2}) + }_{=\text{Dynamic Inversion}} \qquad (10)$$

$$M_{eq} \underbrace{\left\{ (-\lambda_2 \ \lambda_1 \ \lambda_0) \begin{bmatrix} \omega_e - \omega_b \\ \theta_{eb}^{cmd} - \theta_{eb} \\ \theta_{eb}^i \end{bmatrix} \right\} \dot{\theta}_{eb}^i}_{\text{Desired Dynamics}} = \theta_{eb}^{cmd} - \theta_{eb},$$

where the state $\theta^i_{eb}$ is introduced to ensure integral action on the error signal. This choice of $\tau$ ensures the following closed loop dynamics of the engine gimbal:

$$\ddot{\theta}_{eb} + \lambda_2 \dot{\theta}_{eb} + \lambda_1 \theta_{eb} = \lambda_1 \theta_{eb}^{cmd} + \lambda_0 \int_0^T (\theta_{eb}^{cmd} - \theta_{eb}) dt. \qquad (11)$$

Integral action ensures that steady state errors due to step disturbances or specific model inaccuracies will be driven to 0 asymptotically.

The most significant advantage of the present control design procedure is that the control law (given in Eq. (10)) does not affect the unactuated dynamics of the launch vehicle. This implies that the zero dynamics of the closed loop system are not affected by the choice of the control law. The zero dynamics of the closed loop launch vehicle are the same as the unactuated dynamics of the uncontrolled launch vehicle given in Eq. (9) and written below:

$$M_{22}\ddot{\eta}_2 + (D_{21} \ D_{22}) \begin{bmatrix} \dot{\theta}_{eb} \\ \dot{\eta}_2 \end{bmatrix} = g_{d2}.$$

Hence, the zero dynamics are as stable (or unstable) as the open loop unactuated dynamics. If the launch vehicle is structurally designed such that the unactuated dynamics are unstable (but stabilizable), the control variable (CV) will have to be modified to include the unstable states. Naturally, this will affect the performance of the engine gimbal attitude control system.

One of the disadvantages of implementing the control law described in Eq. (10) is that it needs a measurement of deflection and deflection rate of the slosh pendulum, $\theta_{sb}, \omega_{sb}$. These states are not usually measured on a launch vehicle. Generally, in order to stabilize a marginally stable rigid body, an estimate or measurement of its position, attitude and velocity, and angular rate are required. A solution to this problem is the nonlinear observer for the slosh pendulum states discussed below.

In summary, the method for designing and providing a controller for a multi-body assembly includes using vehicle configuration and velocity as states of a rigid body and writing equations of motion for the multi-body assembly. The velocity states that are unactuated are then determined, and this is used to define a decoupling transformation. The decoupling transformation is used to transform the equations of motion such that unactuated states are decoupled from actuated states.

C. Slosh Observer

In order to make the above control design practical (since slosh measurements do not generally exist), an estimate of the slosh states $\omega_{sb}, \theta_{sb}$ is required. Initially, it is necessary to determine the observability properties of the launch vehicle. Consider the transformed launch vehicle dynamics (Eq. (1)) with the output defined as in Eq. (12):

$$N \begin{bmatrix} \dot{\omega}_{sb} \\ \dot{\xi}_4 \end{bmatrix} + E \begin{bmatrix} \omega_{sb} \\ \xi_4 \end{bmatrix} = h_d + h_u \tau \qquad (12)$$

$$y = C \begin{bmatrix} \omega_{sb} \\ \xi_4 \end{bmatrix}$$

where $N, E \in R^{5\times 5}$, $h_d, h_u \in R^5$, $\omega_{sb} = \omega_s - \omega_b$, $\xi_4 = [\omega_b; \omega_e - \omega_b, v_x, v_z]^T$, $1 = [0, 1, 0, 0]^T$ and $C = [0_{4\times 1} I_{4\times 4}]$. By inverting the inertia matrix N, we get Eq. (13).

$$\begin{bmatrix} \dot{\omega}_{sb} \\ \dot{\xi}_4 \end{bmatrix} = \begin{pmatrix} F_{11} & F_{12} \\ F_{21} & F_{22} \end{pmatrix} \begin{bmatrix} \omega_{sb} \\ \xi_4 \end{bmatrix} + \begin{pmatrix} g_1 \\ g_2 \end{pmatrix} \qquad (13)$$

$$y = C \begin{bmatrix} \omega_{sb} \\ \xi_4 \end{bmatrix}$$

where $$F = \begin{pmatrix} F_{11} & F_{12} \\ F_{21} & F_{22} \end{pmatrix} - N^{-1}E \quad (14)$$

$$g = \begin{pmatrix} g_1 \\ g_2 \end{pmatrix} = N^{-1}[h_d + h_u \tau]. \quad (15)$$

In Eq. 12, E captures the coriolis forces acting between the interconnected rigid bodies of the launch vehicle. These forces are a function of the relative velocities of various interconnected rigid bodies. Hence, if the launch vehicle is such that the booster, engine, and slosh pendulum are in a fixed configuration with respect to each other, then E=0. From Eq. (14) we can infer that E=0→F=0. If F=0, observability grammian of the system Eq. (13) is rank deficient and the slosh states cannot be observed. Hence, if the relative angular velocities of the interconnected rigid bodies are such that |E|→0, the observer would perform poorly.

Figure 2A:
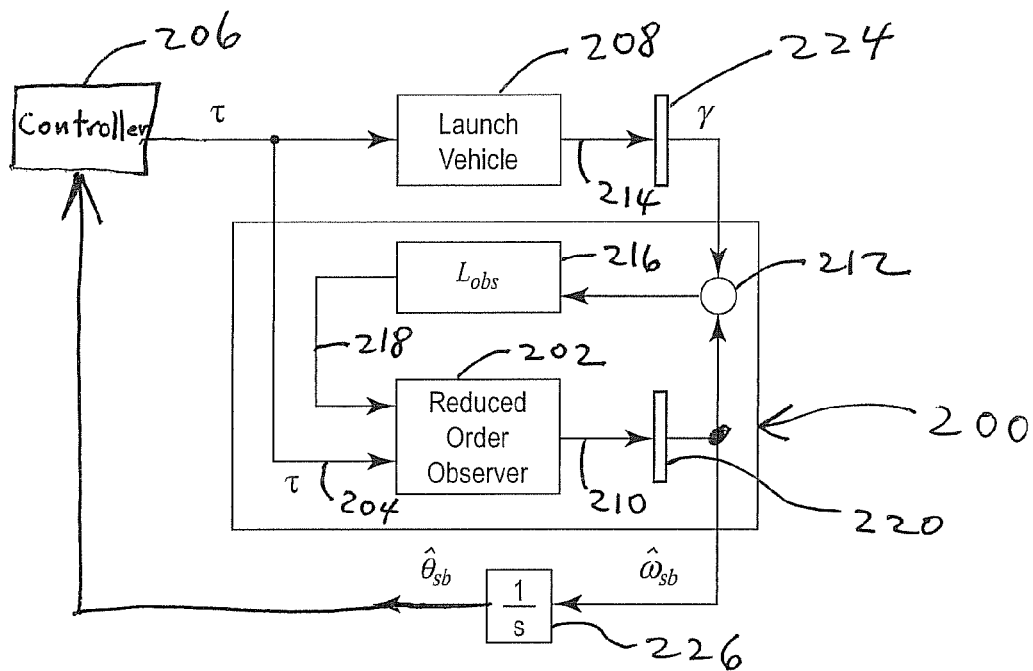
FIG. 2A is a schematic block diagram of a closed loop nonlinear slosh state estimator.

A schematic diagram of a closed loop nonlinear slosh state estimator 200 is shown in FIG. 2A. The slosh observer dynamics derived from the first row of Eq. (13) are as follows:

$$\dot{\hat{\omega}}_{sb} = F_{11}\hat{\omega}_{sb} + (F_{12}\zeta_4 + g_1) + L \begin{bmatrix} y - C\hat{\zeta}_4 \\ y - Cg - CF\hat{\zeta}_4 \end{bmatrix} \quad (16)$$

where $\hat{\zeta}_4 = [\hat{\omega}_{sb}, y^T]^T$. The constant matrix observer gain $L \in \mathbb{R}^{1 \times 8}$ is used to tune the observer performance.

The slosh state estimator 200 includes a reduced order observer module 202 that has a first input 204 in operative communication with a controller 206 for a vehicle 208. The term "reduced order" refers to the fact that the observer has fewer states than the model of the launch vehicle being used. The observer module 202 also has at least one observer output 210 in operative communication with controller 206. A summing device 212 is in operative communication with observer output 210 and a vehicle output 214 from vehicle 208. An observer gain module 216 is in operative communication with summing device 212. A second input 218 to observer module 202 is in operative communication with gain module 216. The outputs 210 and 214 can be in operative communication with respective signal selectors 220 and 224. The signal selectors can be used to choose one signal for use when multiple potential outputs are present. The output 210 can also be in operative communication with an integrator 226 that communicates with controller 206.

During operation of slosh state estimator 200, one or more control signals are delivered from controller 206 to observer module 202 via input 204. For example, the control signals can be an engine gimbal torque values. To estimate the angular velocity of the slosh of a liquid, observer module 202 uses the control signals and signals from vehicle output 214 to mathematically approximate the angular velocity of the slosh. A comparison of the approximated angular velocity from observer module 202 and vehicle output 214 is done by summing device 212. The summing device 212 computes the difference value between the vehicle output 214 and observer output 210 and sends the difference value to gain module 216, which transmits a signal to observer module 202 via input 218 that correlates with the difference value. The observer module 202 then calculates a new angular velocity approximation based on the signals from input 204 and input 218. This angular velocity is then sent through output 210 to integrator 226, which computes the angular distance of the slosh by talking the integral of the angular velocity. The resulting value is then sent to controller 206 to be used in stabilizing the vehicle. The above operation of slosh state estimator 200 is performed continuously in a loop to provide stability control for the vehicle.

In summary, the method for designing a slosh state estimator for a multi-body assembly includes using vehicle configuration and velocity as states of a rigid body and writing equations of motion for the multi-body assembly. A determination is made of the velocity state that needs to be observed. This determination is used to define a decoupling transformation. The decoupling transformation is used to transform the equations of motion such that the observer state is decoupled from the other measured states. The transformed equations of motion can then be used to design the observer discussed above with respect to FIG. 2A.

Figure 2B:
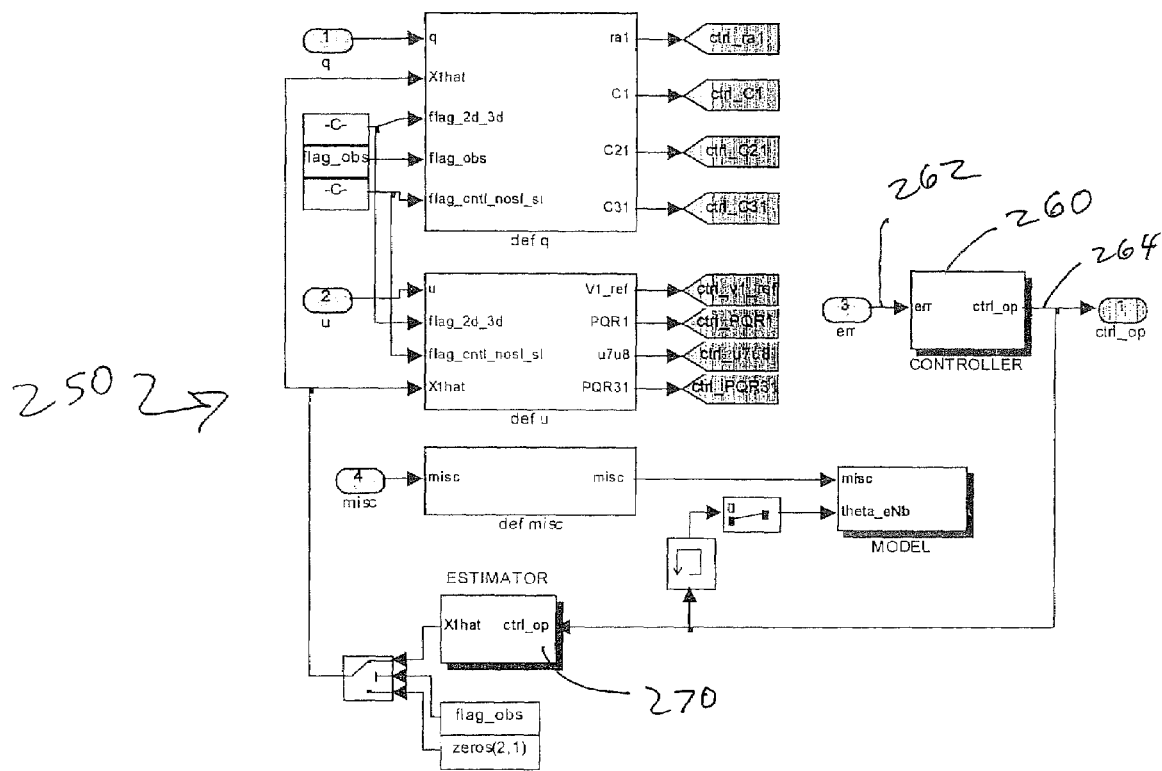
FIG. 2B is a schematic block diagram of a control system for stabilizing a vehicle with fuel slosh.

Using the above design procedures, a control system for stabilizing a vehicle with fuel slosh can be implemented such as shown in the schematic block diagram of FIG. 2B. Such a control system 250 includes a controller 260 designed as discussed above, which has a control input 262 and a control output 264, with control output 264 in communication with the vehicle. A slosh state estimator 270 designed as discussed above is in operative communication with control input 262 and control output 264. The slosh state estimator 270 comprises the various components as discussed above with respect to slosh state estimator 200 of FIG. 2A, including a reduced order observer module, a summing device, and an observer gain module.

During operation, control system 250 first receives a command signal via control input 262. In one example, the command signal can be a doublet wave that directs the engine to move with a certain magnitude, such as 0.5 degrees. In a launch vehicle, the engine is causally connected to both a booster and the slosh such that when the engine moves, the booster and slosh are affected. The slosh is observed by estimator 270 and the positions of the booster, engine, and observed slosh are then output back to controller 260. The controller uses this data to relay a new command signal to the engine, thereby taking into account the slosh position.

Slosh Damping Using Mimo Designs

Figure 1B:
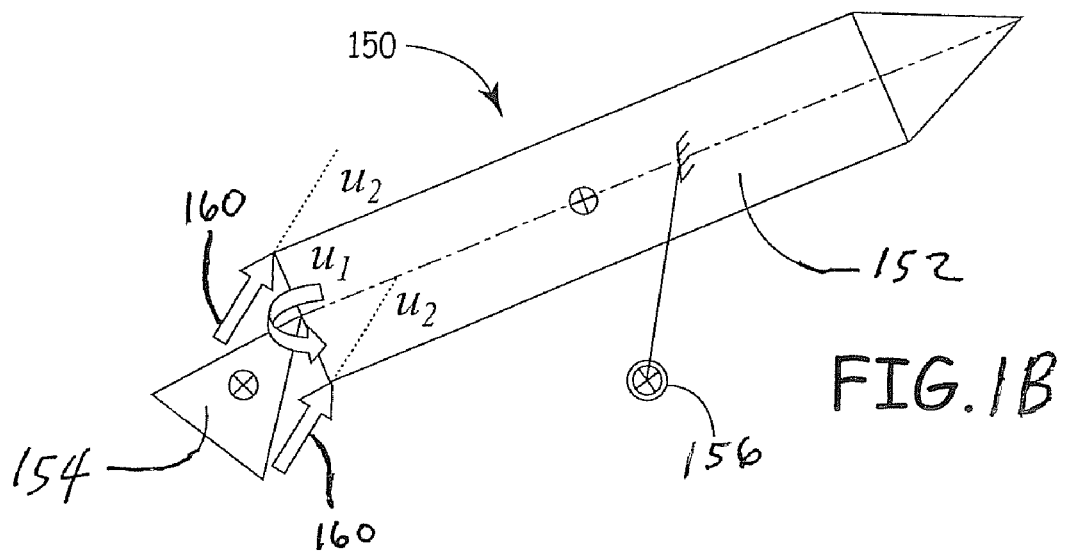
FIG. 1B is a schematic diagram of a thrust augmented launch vehicle used in simulations.

In the previous design, controlling the vehicle motion is limited to the torque on the single engine. The controller of the present invention may also be implemented in a MIMO (multiple-input multiple-output) design to actively damp slosh via use of additional auxiliary thrusts acting on a booster body. For example, auxiliary engines or gas-jet thrusters are two ways to implement the additional thrusts. FIG. 1B is a schematic diagram showing a thrust augmented launch vehicle 150 for slosh damping. The launch vehicle 150 includes a booster 152, a gimballed engine 154, and fuel slosh modeled as a pendulum 156 pivoted about a point on the body axis of booster 152. FIG. 1B also shows the location of two additional thrusts 160 for launch vehicle 150. The angles of thrusts 160 are slaved together and it is their angle $\mu_2$ with respect to booster 152 that is controlled in addition to the angle of engine thrust $\mu_1$ (main engine torque) as before.

While the same design process can be used as outlined above, the control dimension is increased by one to accommodate the angle of the additional thrusts. The set of controlled states includes the angle rate of the slosh relative to the booster, $\omega_{sb}$. Further, the slosh state $\omega_{sb}$ is not commanded with respect to any particular reference, but rather, damping is injected via proportional and integral gains. In this case, the isometric transformation (equivalent to Eq. (8)) cannot ensure the fortuitous result that the uncontrolled states are unaffected by the control inputs ($\tau$, $\mu_2$).

Figure 1C:
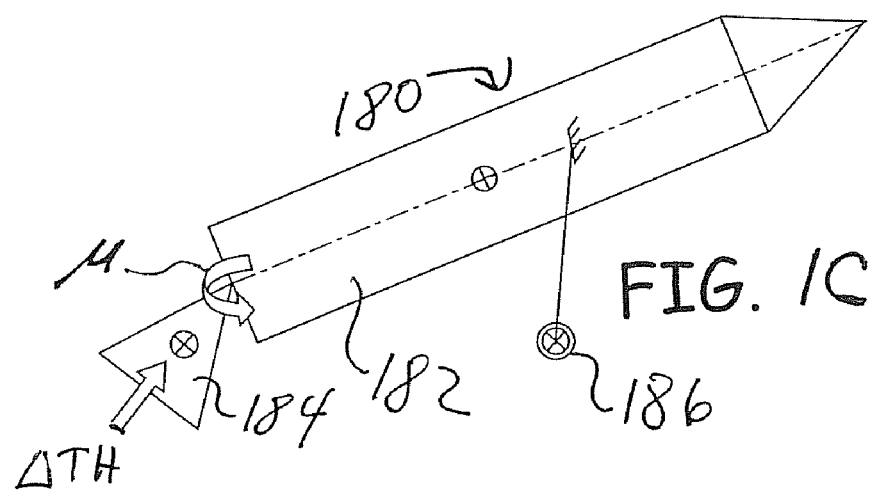
FIG. 1C is a schematic diagram of a launch vehicle used in simulations and having alternative control inputs.

FIG. 1C is a schematic diagram showing a launch vehicle 180 for slosh damping using alternative control inputs. The launch vehicle 180 includes a booster 182, a gimballed engine 184, and fuel slosh modeled as a pendulum 186 pivoted about a point on the body axis of booster 182. FIG. 1C also indicates that the magnitude or size of engine thrust ($\Delta$TH) can be used as a control parameter in addition to the main engine torque $\mu$.

The following examples are given to illustrate the present invention, and are not intended to limit the scope of the invention.

EXAMPLES

The control design procedures described previously were applied to closed-loop, time domain simulations for a launch vehicle. Unless otherwise stated, the controller in every simulation used an observed value of the states ($\hat{\theta}_{sb}$, $\hat{\omega}^{sb}$).

For the control design, the following gain selections were made: $\lambda_2 = 3\omega_n$, $\lambda_1 = 3\omega_n^2$, and $\lambda_0 = \omega_n^3$, where $\omega_n = 6.28$ rad/s. Further, since the control law used was dynamic inversion-based, the vehicle model parameters were explicit. The model parameters used by the control law were those used by the launch vehicle model (given in Table 2 above). With the assumption of "perfect inversion" (i.e., no model mismatch), the above choice for the $\lambda$s yield the following closed-loop transfer function:

$$\frac{\theta_{eb}}{\theta_{eb}^{cmd}} = \frac{3\omega_n^2 + \omega_n^3}{s^3 + 3\omega_n s^2 + 3\omega_n^2 s + \omega_n^3} \quad (17)$$

In each of the simulations in the following examples, actuator and sensor dynamics were neglected as well as sensor noise. Each simulation started with the launch vehicle at rest in a vertical attitude ($\theta_b$=90 degrees). The external command was to the engine gimbal angle, $\theta_{eb}$. Its command, $\theta^{cmd}_{eb}$, was a 0.5 degree amplitude doublet whose period was 4 seconds. The doublet command entered at t=5 seconds. Each simulation lasted for 20 seconds.

Figure 3:
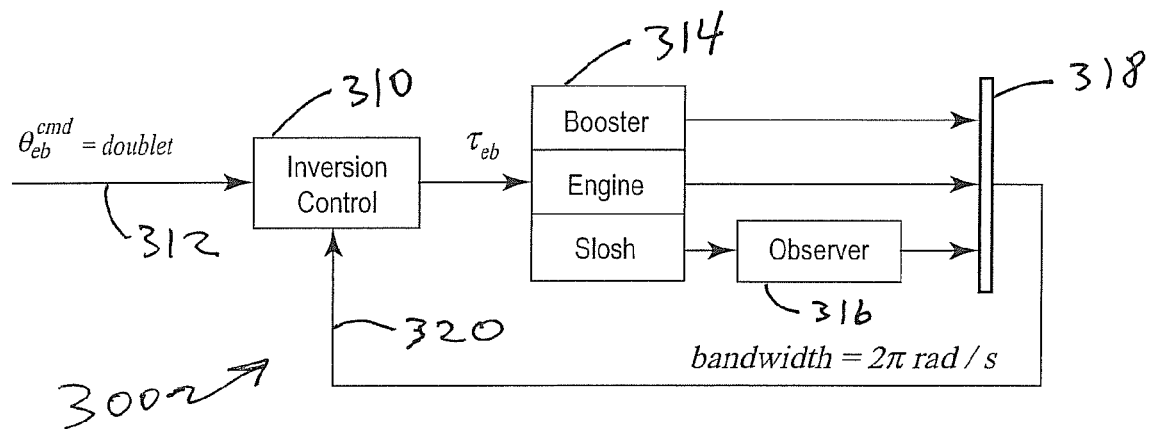
FIG. 3 is a schematic block diagram of a closed loop system used in simulations.

FIG. 3 is a schematic block diagram showing a closed loop system 300 used in the simulations. The closed loop 300 includes an inversion control module 310 that has a first input 312 for receiving an external command (e.g., engine gimbal angle command, $\theta^{cmd}_{eb}$). The control module 310 is in operative communication with a launch vehicle model 314 representing a booster, an engine, and fuel slosh, each with a corresponding output. The output of the fuel slosh communicates with a slosh state estimator 316 such as described previously. All of the outputs are in operative communication with a signal selector 318, which communicates with control module 310 via a second input 320.

Example 1

Output Feedback for High-Fidelity Model

Figure 4A:
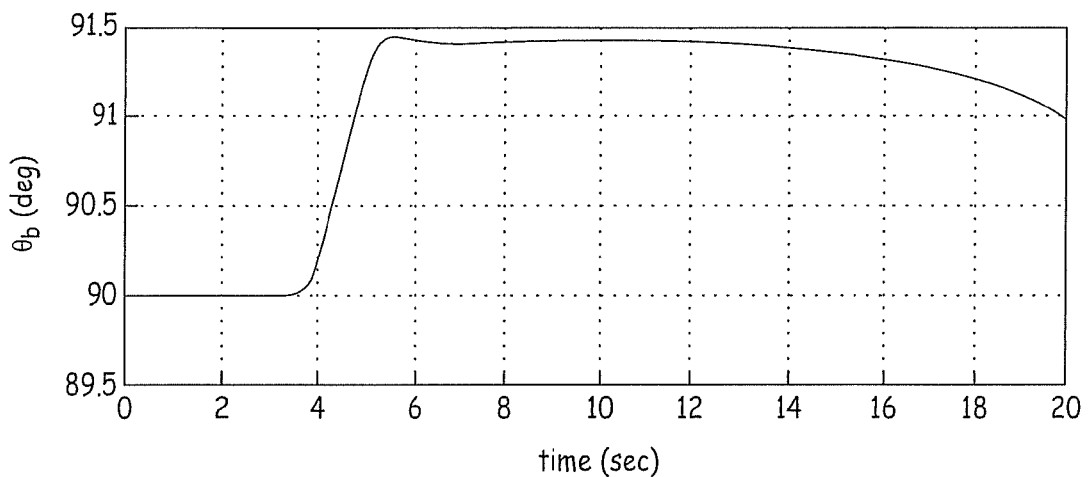
FIGS. 4A-4C and 5 are graphs showing plot results for simulations run on the closed loop system of FIG. 3 using output feedback in a high-fidelity controller.
Figure 4B:
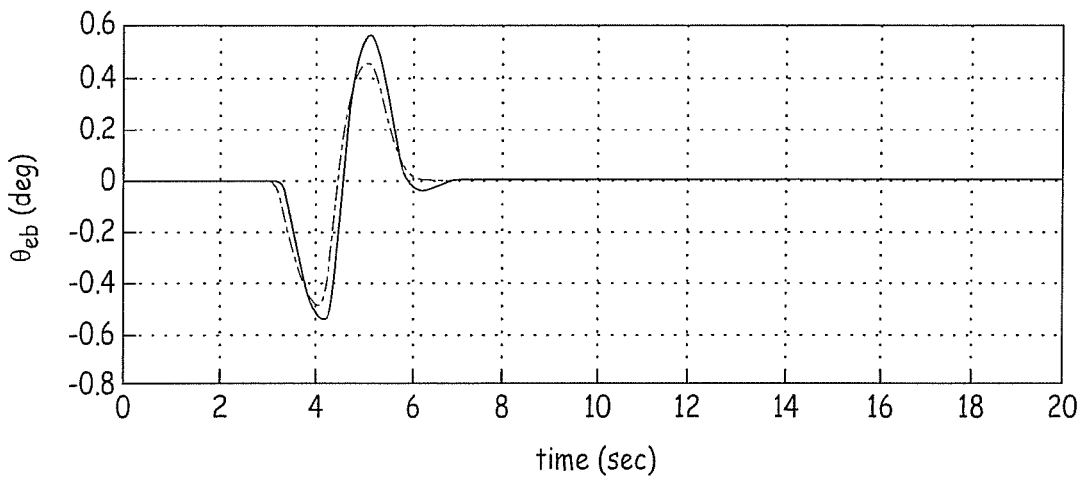
Figure 4C:
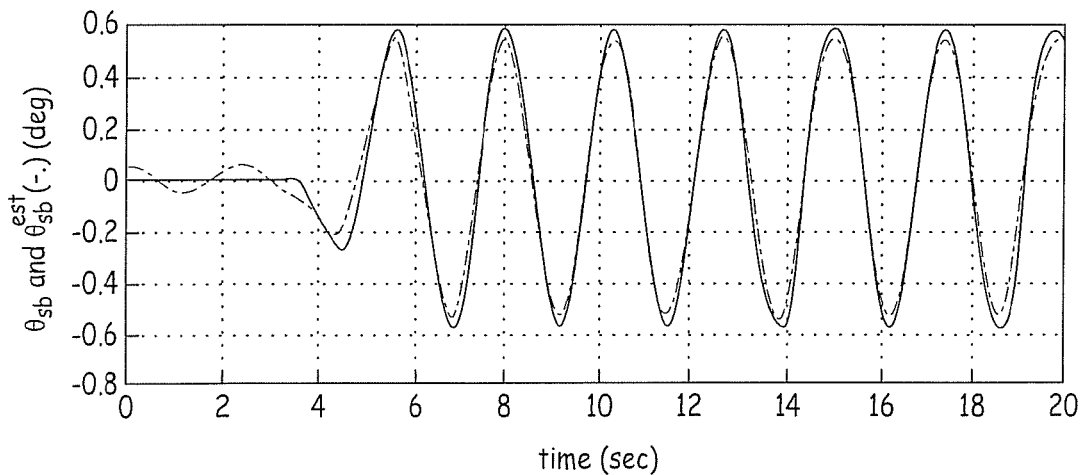
Figure 5:
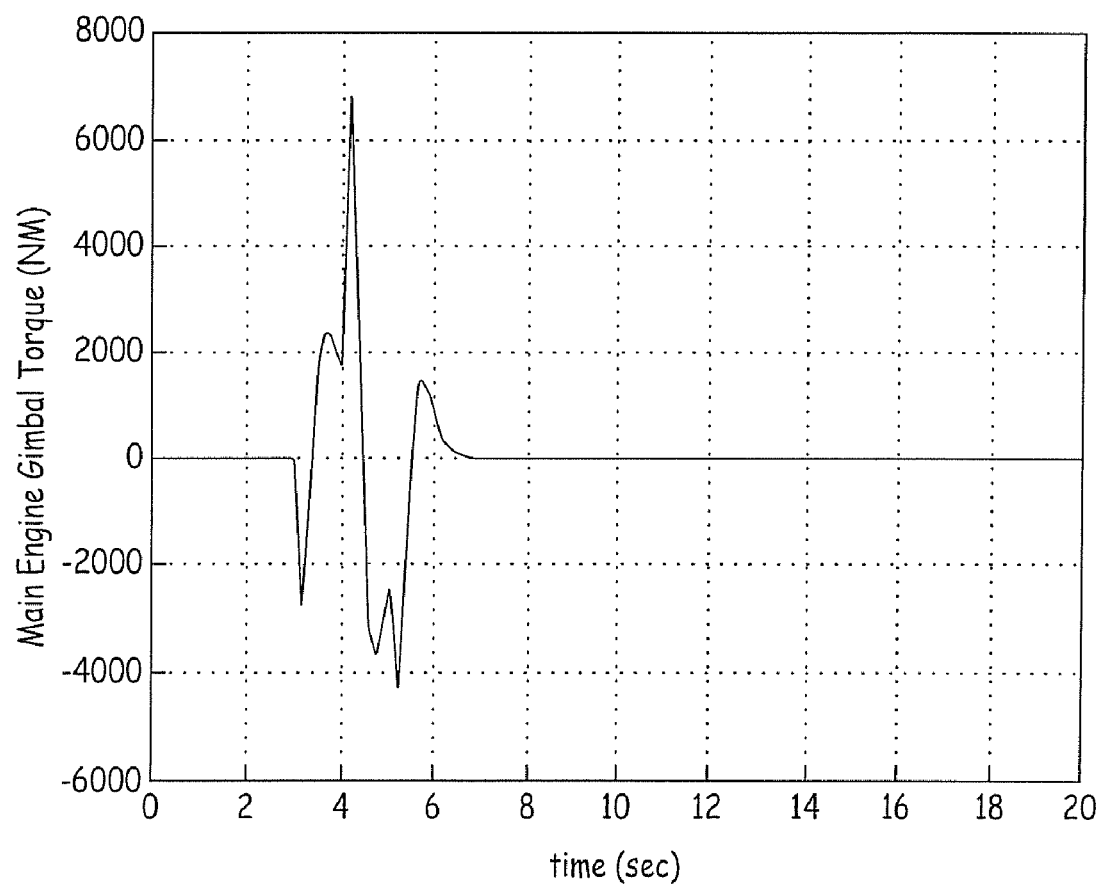

For this simulation, it was assumed that the controller was designed for the high-fidelity model of the launch vehicle, which includes the effect of slosh dynamics. The dynamic inversion control law will 'invert' the slosh motion based on the estimates from the slosh state observer. The plots of the simulation are shown in the graphs of FIGS. 4A-4C and FIG. 5. FIG. 4A shows the attitude of the booster, $\theta_b$, where $\theta_b$=90 degrees implies vertical. The solid line in FIG. 4B represents the angle of the engine with respect to the booster, $\theta_{eb}$, where $\theta_{eb}$=0 implies the engine is aligned with the booster. This is the angle that is controlled and commanded with the doublet. The command is also shown with a dashed line. In FIG. 4C the solid line shows the angle of the slosh pendulum with respect to the booster, $\theta_{sb}$, with $\theta_{sb}$=0 indicating that the slosh pendulum is aligned with the booster. The dashed line in FIG. 4C is the estimate of the slosh pendulum. The initial condition of the slosh observer is different from the initial condition of the slosh pendulum which explains the sinusoidal transient at the beginning of the simulation.

The curve in FIG. 4B shows that engine angle behaved in accordance with the transfer function in Eq. 17. Consistent with the modeling assumptions, it can be seen that the slosh mass (FIG. 4C) did not get excited until the doublet command enters and is undamped thereafter. The slosh mass couples into the booster response (FIG. 4A) where the oscillation from the sloshing is apparent in addition to the (roughly) step attitude change due to the engine angle doublet. Recall that, at this point, there are no outer loops to stabilize the booster itself, so as the simulation progressed, the inherent instability of the system becomes more apparent. Finally, in FIG. 5 the commanded torque is shown. Aside from the large peaks due to the unreasonably sharp commands at the edges of the doublets (they would, in practice, be smoother as they would come from some outer loops), the torque was well behaved and within reason.

Example 2

Output Feedback for Low-Fidelity Model

Figure 6A:
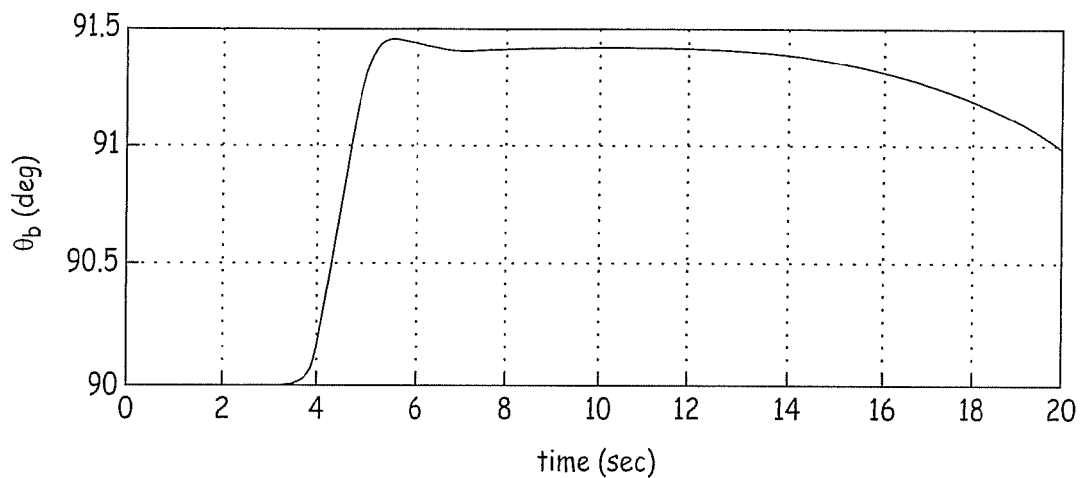
FIGS. 6A-6C are graphs showing plot results for simulations run on the closed loop system of FIG. 3 using a low-fidelity controller.
Figure 6B:
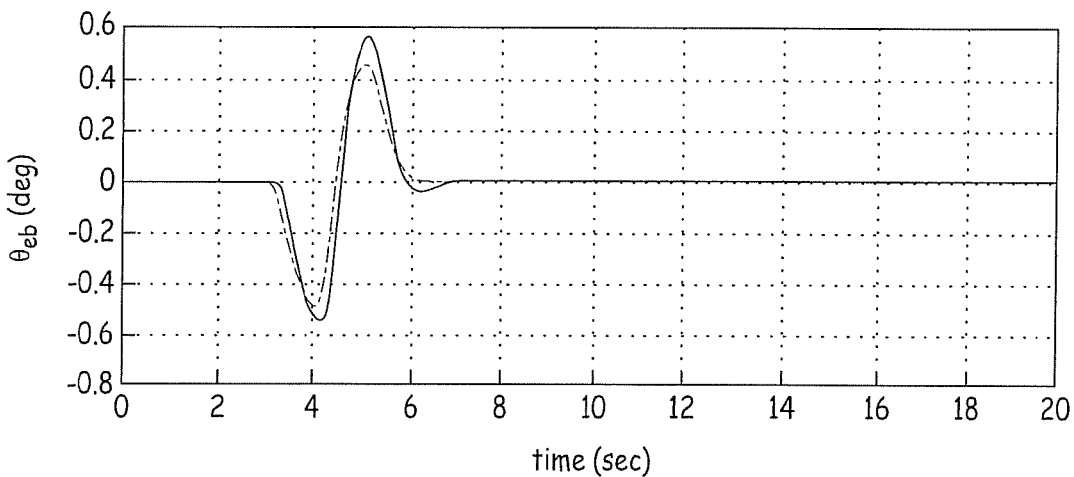
Figure 6C:
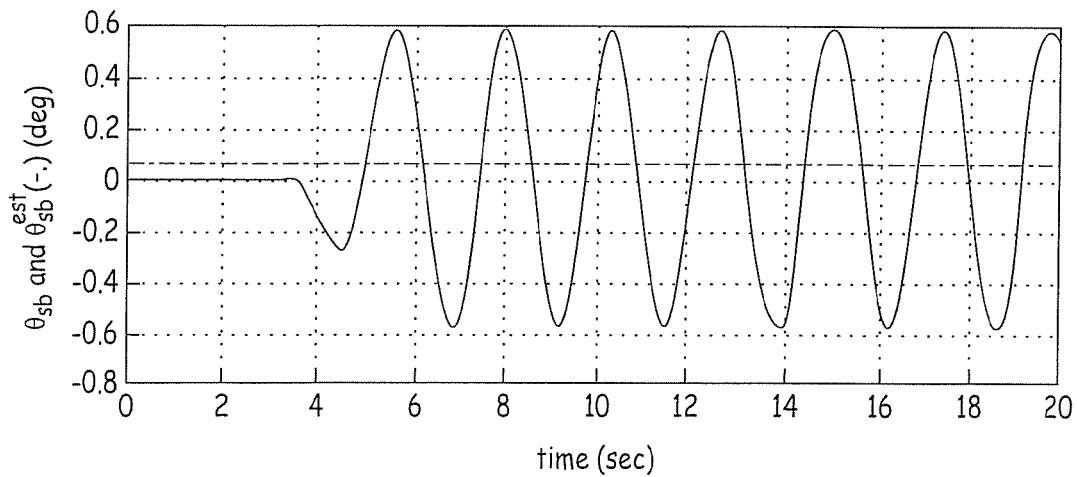

For this simulation, the control law did not account for the dynamics and estimates of the slosh states during inversion. The control law did, however, still consider the engine and booster as separate bodies with coupled dynamics. This particular design follows the procedure outlined above with respect to the low-fidelity dynamic equation (Eq. (2)). The graphs of FIGS. 6A-6C shows the responses for this simulation. Comparison of the graphs of FIGS. 6A-6C with those of FIGS. 4A-4C shows no significant differences. One inference from this is that the particular configuration chosen was not particularly sensitive to the slosh state. However, other configurations, for example moving the slosh attach point further forward of the booster center-of-gravity, may cause the slosh dynamics and their control to become important.

Example 3

Comparison of High-Fidelity and Low-Fidelity Models

Figure 7A:
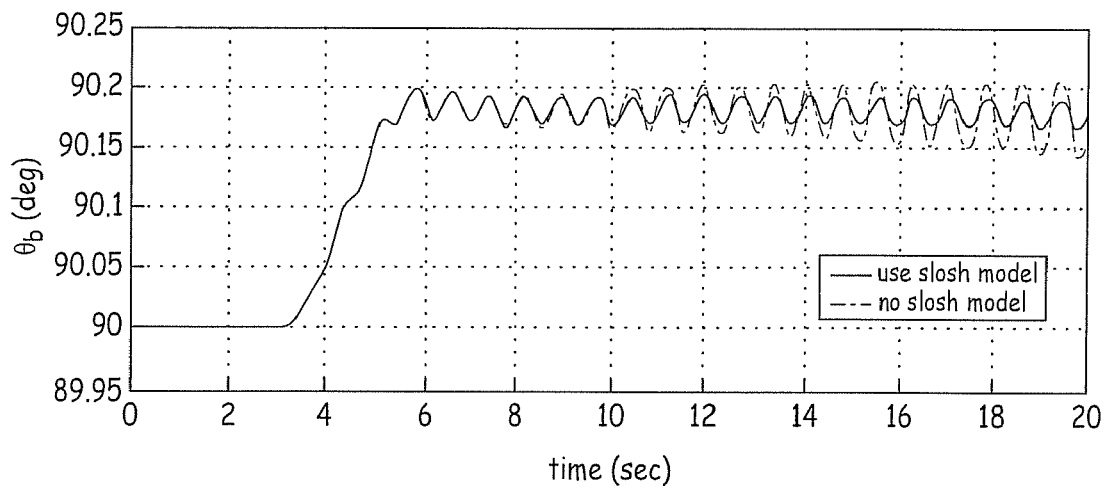
FIGS. 7A-7C are graphs showing plot results for simulations run on the closed loop system of FIG. 3 comparing responses of high-fidelity and low-fidelity controllers.
Figure 7B:
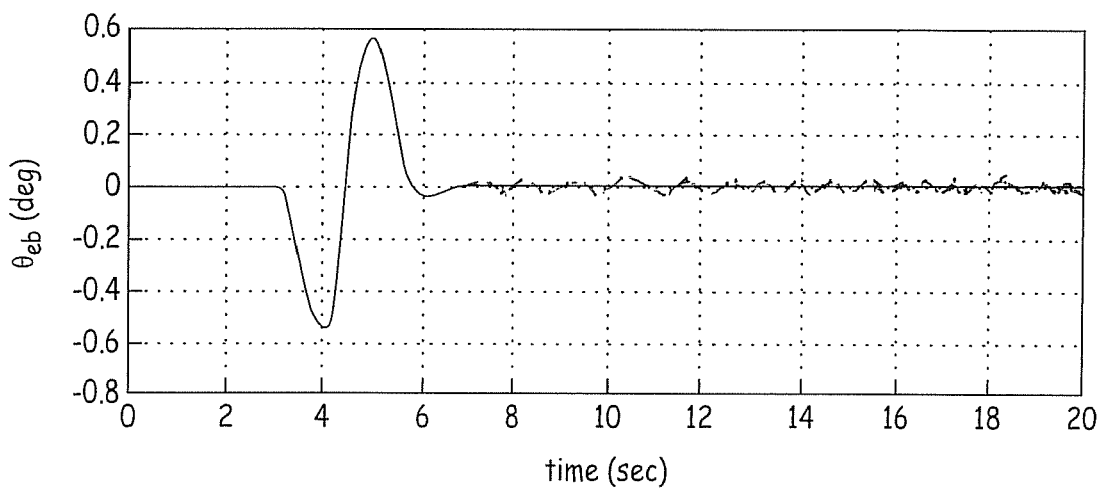
Figure 7C:
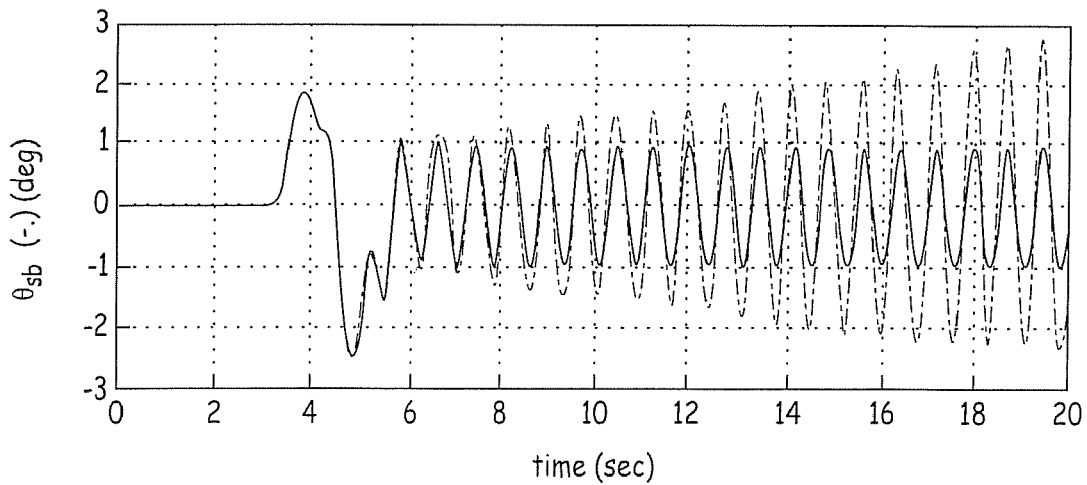

The graphs of FIGS. 7A-7C show the responses of a high-fidelity and a low-fidelity controller designed for a launch vehicle with different vehicle parameters (see Table 2 above). The only parameters that were different were the slosh mass, and the attach point of the slosh pendulum (all other vehicle parameters stayed the same). In FIGS. 7A-7C, the solid lines show a stable (but undamped) response when the slosh dynamics are accounted for explicitly by the control law (high-fidelity controller). The unstable dot-dashed lines show a similar simulation with a control law that neglects the existence of slosh dynamics (low-fidelity controller). With this comparison, it is clear that there are cases in which accounting for the slosh dynamics is critical for the stability of the system.

Example 4

MIMO Controllers

Figure 8:
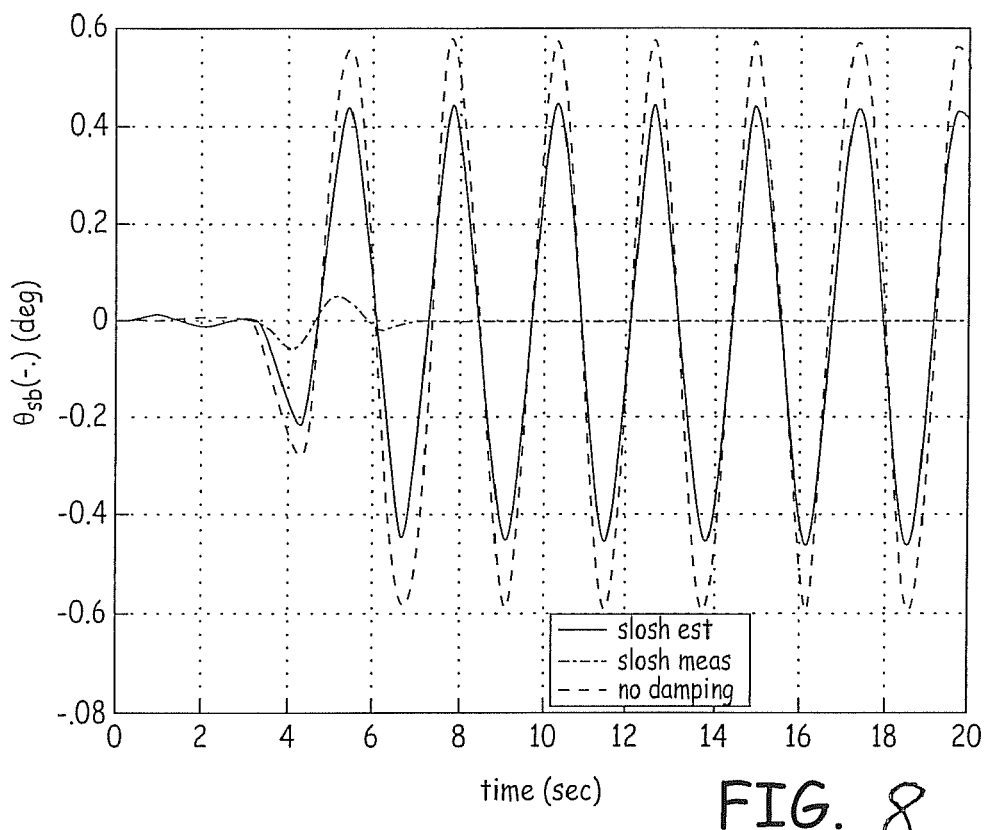
FIG. 8 is a graph showing plot results comparing the slosh angle for three simulations using full-state feedback.

The graph of FIG. 8 shows a comparison of the resulting slosh angle for three simulations using full-state feedback for a MIMO controller employing the control inputs for vehicle 150 of FIG. 1B. These control inputs included the angle of the auxiliary thrusters and the angle of engine thrust (torque). The dashed line was the undamped slosh response from a closed-loop simulation similar to that shown in FIG. 4C. The solid line shows the response when the inversion based controller used an estimate of the slosh states. Note that some slosh attenuation was achieved between t=4 s and t=6 s. This is the time period when the doublet is commanded and both booster angular velocity, $\omega_b$, and engine angular velocity, $\omega_{eb}$, are non-zero, thus leading to $F \neq 0$ in Eq. (13). Simultaneously, the observability grammian was full rank. It should be noted that the slosh is observable only during doublet excitation. After t=6 s, the observer state $\hat{\omega}_{sb}$ damps to 0 leading to no control action from the auxiliary thrusters and the slosh pendulum resumes its undamped oscillation. The dot-dashed line shows the response of the slosh angle when the inversion based controller used a measurement of the slosh rate and position. That is, it was assumed that slosh states are measurable using appropriate sensors. The response indicates that the controller was able to successfully damp slosh.

Figure 9:
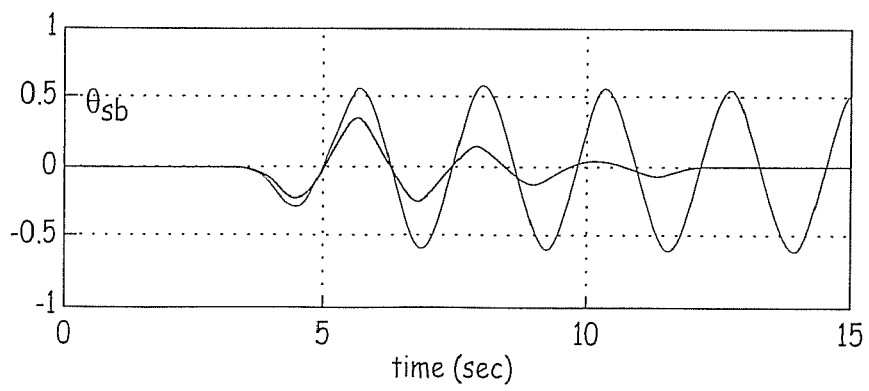
FIG. 9 is a graph showing plot results comparing the slosh angle for two simulations using full-state feedback.

The graph of FIG. 9 shows a comparison of the resulting slosh angle for two simulations using full-state feedback for a MIMO controller employing the control inputs for vehicle 180 of FIG. 1C. These control inputs included the angle of engine thrust, and the magnitude of the engine thrust. The dashed line in FIG. 9 is the undamped slosh response from a closed-loop simulation similar to that shown in FIG. 4C. The solid line in FIG. 9 depicts the response when the MIMO controller used an estimate of the slosh states. This shows the slosh dampening effect when using the two control inputs of engine thrust angle and engine thrust magnitude along with and the slosh observer.

The simulations described in the above examples indicate that if slosh dynamics are not actively accounted for in the design of a controller, vehicle instability may result.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for stabilizing a vehicle with fuel slosh, the method comprising:
   providing a controller for a multi-body assembly, the controller formed by a method comprising:
   selecting vehicle configuration and velocity as states of a rigid body;
   writing equations of motion for the multi-body assembly;
   determining velocity states that are unactuated;
   defining a decoupling transformation from the unactuated velocity states; and
   transforming the equations of motion using the decoupling transformation such that unactuated states are decoupled from actuated states; and
   coupling a slosh state estimator to the controller such that the slosh state estimator is in operative communication with an input to the controller and an output from the controller.

2. The method of claim 1, wherein the slosh state estimator is formed by a method comprising:
   selecting vehicle configuration and velocity as states of a rigid body;
   writing equations of motion for the multi-body assembly;
   determining a velocity state that needs to be observed;
   defining a decoupling transformation from the velocity state that needs to be observed; and
   transforming the equations of motion using the decoupling transformation such that an observer state is decoupled from other measured states.

3. The method of claim 1, wherein the vehicle comprises a multi-body launch vehicle.

4. The method of claim 3, wherein the method provides inner loop control of the multi-body launch vehicle.

5. The method of claim 3, wherein an attitude dynamic of the multi-body launch vehicle is underactuated.

6. The method of claim 3, further comprising modeling a booster body as a first rigid body, an engine body as a second rigid body, and a fuel slosh as a third rigid body.

7. The method of claim 6, further comprising providing a control input comprising an angle of engine thrust.

8. The method of claim 7, wherein the angle of engine thrust comprises an engine gimbal torque value.

9. The method of claim 6, further comprising providing a control input comprising an angle of engine thrust and an angle of auxiliary thrusters.

10. The method of claim 6, further comprising providing a control input comprising an angle of engine thrust and a magnitude of engine thrust.

11. The method of claim 1, wherein the method uses a dynamic inversion-based nonlinear control algorithm that accounts for coupled dynamics of interconnected rigid bodies.

12. The method of claim 1, wherein the slosh state estimator provides an estimate of fuel slosh dynamics to the controller.

13. A system for stabilizing a vehicle with fuel slosh, the system comprising:
   a controller having a control input and a control output, the control output in communication with the vehicle; and
   a slosh state estimator in operative communication with the control input and the control output of the controller, the slosh state estimator comprising:
   a reduced order observer module;
   a first input to the observer module, the first input in operative communication with the control output;
   at least one output from the observer module, the output in operative communication with the control input;
   a summing device in operative communication with the output from the observer module and an output from the vehicle;
   an observer gain module in operative communication with the summing device; and
   a second input to the observer module, the second input in operative communication with the gain module.

14. The system of claim 13, wherein the output from the observer module is in operative communication with a signal selector.

15. The system of claim 13, wherein the output from the observer module is in operative communication with an integrator.

16. A computer readable medium having instructions stored thereon for implementing a method for providing a controller for use in stabilizing a vehicle with fuel slosh, the controller formed by a method comprising:

selecting vehicle configuration and velocity as states of a rigid body;

writing equations of motion for the multi-body assembly;

determining velocity states that are unactuated;

defining a decoupling transformation from the unactuated velocity states; and transforming the equations of motion using the decoupling transformation such that unactuated states are decoupled from actuated states.

17. The computer readable medium of claim 16, further comprising providing a slosh state estimator formed by a method comprising:

selecting vehicle configuration and velocity as states of a rigid body;

writing equations of motion for the multi-body assembly;

determining a velocity state that needs to be observed;

defining a decoupling transformation from the velocity state that needs to be observed; and transforming the equations of motion using the decoupling transformation such that an observer state is decoupled from other measured states.

18. The computer readable medium of claim 17, wherein the method further comprises modeling a booster body as a first rigid body, an engine body as a second rigid body, and a fuel slosh as a third rigid body.

19. The computer readable medium of claim 18, wherein the method further comprises providing a control input comprising an angle of engine thrust.

20. The computer readable medium of claim 19, wherein the control input further comprises an angle of auxiliary thrusters or a magnitude of engine thrust.

* * * * *

UNITED STATES PATENT AND TRADEMARK OFFICE
CERTIFICATE OF CORRECTION

PATENT NO.       : 7,580,778 B2                                          Page 1 of 1
APPLICATION NO.  : 11/425925
DATED            : August 25, 2009
INVENTOR(S)      : Krishnaswamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this

Fourteenth Day of September, 2010

David J. Kappos
*Director of the United States Patent and Trademark Office*